United States Patent
Hamburger (10) Patent No.: US 11,016,453 B2
(45) Date of Patent: May 25, 2021

(54) SYSTEMS AND METHODS FOR CONTROLLING A POWER GENERATION UNIT

(71) Applicant: GENERAL ELECTRIC TECHNOLOGY GMBH, Baden (CH)

(72) Inventor: Alexander Joseph Hamburger, Vaughan (CA)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 182 days.

(21) Appl. No.: 15/946,226

(22) Filed: Apr. 5, 2018

(65) Prior Publication Data
US 2019/0310596 A1    Oct. 10, 2019

(51) Int. Cl.
*G05B 19/042* (2006.01)
*H02J 3/00* (2006.01)

(52) U.S. Cl.
CPC ........... *G05B 19/042* (2013.01); *H02J 3/00* (2013.01); *G05B 2219/2639* (2013.01)

(58) Field of Classification Search
CPC .. G05B 19/042; G05B 2219/2639; H02J 3/00
See application file for complete search history.

(56) References Cited

U.S. PATENT DOCUMENTS

| 5,202,822 | A  | * | 4/1993  | McLaughlin | G06F 11/2017 700/82 |
|-----------|----|---|---------|------------|---------------------|
| 10,250,562 | B1 | * | 4/2019 | Srinath | H04L 63/0263 |
| 2002/0121998 | A1 | * | 9/2002 | Yamazaki | G01D 1/18 341/155 |
| 2003/0187520 | A1 | | 10/2003 | Pearlman | |
| 2007/0168058 | A1 | * | 7/2007 | Kephart | G05B 9/03 700/82 |
| 2009/0076628 | A1 | * | 3/2009 | Smith | G05B 19/4184 700/3 |
| 2015/0091550 | A1 | | 4/2015 | Rotem | |
| 2017/0052523 | A1 | * | 2/2017 | Grosch | G05B 19/0426 |

OTHER PUBLICATIONS

Achieving Real-Time Performance on a Virtualized Industrial Control Platform, Intel, 2014, pp. 1-7 (Year: 2014).*
Extended European Search Report dated Jun. 26, 2019.

* cited by examiner

*Primary Examiner* — Jason Lin
(74) *Attorney, Agent, or Firm* — Eversheds Sutherland (US) LLP (57) ABSTRACT

Exemplary embodiments described in this disclosure can pertain to a controller apparatus that provides control signals to a power generation unit. The controller apparatus can include a first controller, a second controller, and a supervisor that can place the first controller in an in-service state and the second controller in a standby state. The first controller provides control signals to the power generation unit when in the in-service state. The second controller can include a copy of an application program contained in the first controller. This copy of the application program can be modified or replaced while the second controller is in the standby state. The supervisor may then opt to place the second controller in the in-service state and place the first controller in the standby state. The switch-over of controllers is carried out in a substantially simultaneous manner that eliminates interruption in control operations.

20 Claims, 5 Drawing Sheets

SYSTEMS AND METHODS FOR CONTROLLING A POWER GENERATION UNIT

FIELD OF THE DISCLOSURE

This disclosure generally relates to controller systems, and more particularly, to controller systems and methods for controlling a physical asset such as a power generation unit.

BACKGROUND OF THE DISCLOSURE

Electric power is typically generated in a power plant by using one or more power generation units. A typical power generation unit can include a compressor that provides pressurized air to a combustor where the pressurized air is mixed with fuel and ignited for producing hot combustion gases. The hot combustion gases flow downstream from the combustor and into a turbine where energy is extracted from the hot combustion gases in order to rotate rotor blades that are attached to a shaft. The rotation of the shaft can be used to generate electricity in an electric generator and the generated electricity coupled into an electric grid for distribution to customers.

Interruption in the distribution of electricity to customers, particularly any interruption as a result of a malfunction or poor performance of the power generation unit, can be expensive and frustrating for customers. Consequently, great care is taken to ensure reliability and efficiency in the power generation unit and in a controller that controls the power generation unit. Towards this end, the hardware and the software used in the controller is often designed more towards robustness such as to enable the controller to provide reliable and continuous operation for many years.

However, it may be desirable at times to replace, upgrade, or repair, some of the existing software in a controller prior to a scheduled maintenance shutdown. Some traditional solutions entail powering down the controller in order to do so, thus introducing various risks such as for example, a malfunctioning of the power generation unit or sub-optimal performance of the power generation unit while the controller is shut down.

BRIEF DESCRIPTION OF THE DISCLOSURE

Embodiments of the disclosure are directed generally to systems and methods for providing control signals to a physical asset such as a power generation unit.

According to one exemplary embodiment of the disclosure, a method can include generating a sensor signal based on sensing at least one operating condition of a physical asset; utilizing an analog-to-digital converter to generate a first digitized sensor signal sample of the sensor signal; receiving the first digitized sensor signal sample in a controller apparatus; executing a first application program in the controller apparatus to generate a first control signal based at least in part on processing the first digitized sensor signal sample; placing the first application program in an in-service state to allow transmission of the first control signal by the first application program to the physical asset; utilizing the first application program to transmit the first control signal to the physical asset; executing a second application program to generate the first control signal based at least in part on processing the first digitized sensor signal sample; placing the second application program in a standby state to prevent transmission of the first control signal by the second application program to the physical asset; receiving a first interrupt signal from the analog-to-digital converter; and responding to the first interrupt signal, at least in part, by placing the first application program in the standby state and placing the second application program in the in-service state.

According to another exemplary embodiment of the disclosure, a method can include generating a sensor signal based on sensing at least one operating condition of a physical asset; utilizing an analog-to-digital converter to generate digitized sensor signal samples of the sensor signal; receiving the digitized sensor signal samples in a controller apparatus; executing a first application program in the controller apparatus to generate one or more control signals based at least in part on processing the digitized sensor signal samples; placing the first application program in an in-service state to allow transmission of the one or more control signals by the first application program to the physical asset; executing a second application program in the controller apparatus to generate the one or more control signals based at least in part on processing the digitized sensor signal samples; placing the second application program in a standby state to prevent transmission of the one or more control signals by the second application program to the physical asset; and placing the first application program in the standby state and placing the second application program in the in-service state in a first time period that is less than one clock cycle of a sampling clock utilized by the analog-to-digital converter.

According to yet another exemplary embodiment of the disclosure, a system can include a power generation unit, at least one sensor, an analog-to-digital converter, and a controller apparatus. The sensor(s) are configured to sense at least one operating condition of the power generation unit and generate a first sensor signal indicative of the at least one operating condition of the power generation unit. The analog-to-digital converter is configured to receive the first sensor signal from the at least one sensor and generate digitized sensor signal samples by using a sampling clock. The controller apparatus can include an input interface configured to receive the digitized sensor signal samples; an output interface configured to propagate one or more control signals to the power generation unit; a memory configured to store a first application program and a second application program; and a processor operable to access the memory and execute operations such as placing the first application program in an in-service state; executing the first application program to generate at least a first control signal by processing the digitized sensor signal samples; placing the second application program in a standby state; executing the second application program to generate at least the first control signal by processing the digitized sensor signal samples; receiving a first interrupt signal from the analog-to-digital converter; and responding to the first interrupt signal, at least in part, by placing the first application program in the standby state and placing the second application program in the in-service state.

Other embodiments and aspects of the disclosure will become apparent from the following description taken in conjunction with the following drawings.

BRIEF DESCRIPTION OF THE DRAWINGS

Having thus described the disclosure in general terms, reference will now be made to the accompanying drawings, which are not drawn to scale, and wherein:

The disclosure will be described more fully hereinafter with reference to the drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. Like numbers refer to like elements throughout. It should be understood that certain words and terms are used herein solely for convenience and such words and terms should be interpreted as referring to various objects and actions that are generally understood in various forms and equivalencies by persons of ordinary skill in the art. For example, the word "link" as used herein generally refers to various types of elements used for conveying signals and/or data from one device to another, such as a single wire, a set of wires (a bus), or a wireless link. Furthermore, the word "example" as used herein is intended to be non-exclusionary and non-limiting in nature. More particularly, the word "exemplary" as used herein indicates one among several examples, and it should be understood that no undue emphasis or preference is being directed to the particular example being described.

DETAILED DESCRIPTION

In terms of a general overview, certain embodiments described in this disclosure pertain to a system having a controller apparatus for controlling a physical asset such as a power generation unit. For purposes of description, the physical asset will be referred to herein as a power generation unit. It should however be understood that the systems and methods disclosed herein can be applied to a wide variety of physical assets and are not limited to a power generation unit. For example, a physical asset can be an electric power generation unit, an electrical transformer, an electric motor, or an electric power transmission line. One technical effect of certain embodiments of the disclosure is that switch-over of controllers can be carried out in a manner that minimizes or otherwise reduces any interruption in control operations. Further, another technical effect of certain embodiments of the disclosure is that modification or replacement of various application programs may be carried out for various reasons such as for revising the application program to address software bugs, updating the application program to provide additional features, or replacing the application program with an updated or newer application program.

In one exemplary embodiment, the controller apparatus can include a first controller and a second controller and can further include a supervisor that supervises various operations of the two controllers. For example, the supervisor can place the first controller in an in-service state and the second controller in a standby state. An application program contained in the first controller is operative to provide control signals to the power generation unit when the first controller has been placed in the in-service state. Another application program contained in the second controller that is in the standby state can be a copy of the application program contained in the first controller. This copy of the application program can be modified or replaced while the second controller is in the standby state. The modification or replacement may be carried out for various reasons such as for revising the application program to address software bugs, updating the application program to provide additional features, or replacing the application program with an updated or newer application program.

The second controller may inform the supervisor once the modification of the application program has been completed. The supervisor may then opt to place the second controller in the in-service state and the first controller in the standby state for various reasons. In a traditional system, this operation may require taking the first controller off-line before placing the second controller in the in-service state. During this time, the power generation unit would be left in an uncontrolled state that can lead to various types of problems. Consequently, in accordance with the disclosure, the switch-over of controllers is carried out in a manner that minimizes or otherwise reduces any interruption in control operations.

In one exemplary implementation in accordance with the disclosure, the supervisor may place the second controller in the in-service state and the first controller in the standby state in response to receiving a trigger signal from an analog-to-digital converter. The trigger signal is operative as an interrupt that is acted upon by the supervisor for initiating the switch-over. Here again, the switch-over of controllers is carried out in a manner that minimizes or otherwise reduces any interruption in control operations.

Figure 1:
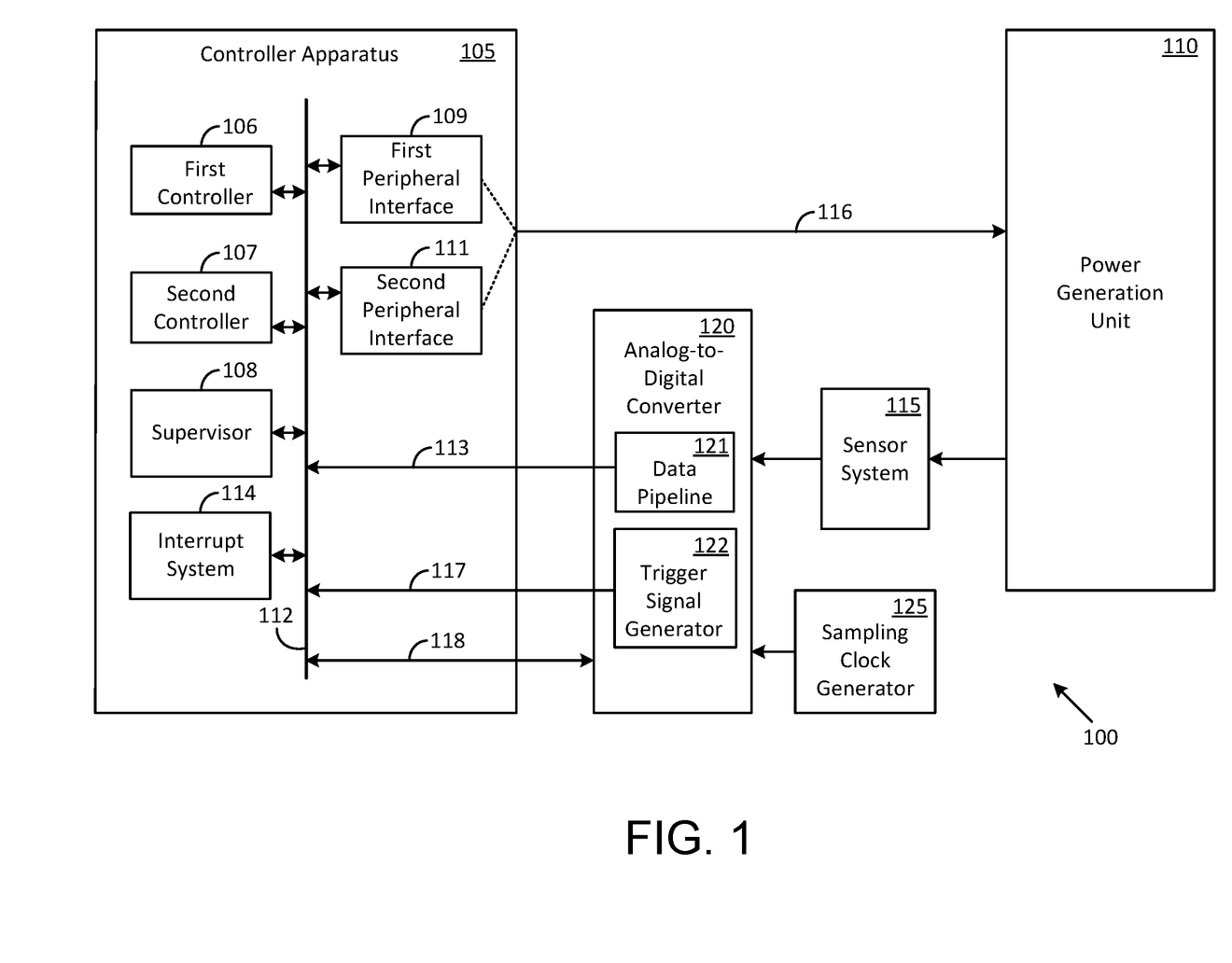
FIG. 1 illustrates an exemplary system that includes a controller apparatus for controlling a power generation unit in accordance with an exemplary embodiment of the disclosure.

FIG. 1 illustrates an exemplary system 100 that can include a controller apparatus 105 for controlling a power generation unit 110 in accordance with an exemplary embodiment of the disclosure. The system 100 can also include a sensor system 115, an analog-to-digital converter (ADC) 120, and a sampling clock generator 125. A communication link 116 may be utilized by the controller apparatus 105 to provide control signals to the power generation unit 110.

Various components that may be coupled to, or be a part of, the power generation unit 110 are neither shown nor described herein in order to avoid distracting from certain aspects that are more directly pertinent to the disclosure. Such components can include one or more high-power controllers that receive the control signals provided by the controller apparatus 105 at logic level voltages (0V and +5V, for example) and translates these logic level voltages into larger amplitude voltages that are suitable for operating devices such as switches, relays, pumps, and motors of the power generation unit 110.

The sensor system 115 may include one or more sensors that are used to monitor various operating conditions of the power generation unit 110. For example, a temperature sensor may be used to monitor the temperature of a portion of the power generation unit 110, a pressure sensor may be used to monitor the pressure inside a combustor portion of the power generation unit 110, and a tachometer or accelerometer for monitoring the rotation speed of a rotary shaft of the power generation unit 110. Typically, the sensor system 115 outputs one or more analog sensor signals that represent one or more monitored operating conditions.

The analog sensor signal(s) may be coupled into the analog-to-digital converter 120, which can use a sampling clock to sample the analog sensor signal(s) and produce digitized sensor signal samples. Each digitized sensor signal sample can be indicative of an amplitude of an analog sensor signal at the various sampling instants defined by, for example, the sampling clock and provided by the sampling clock generator 125.

In accordance with one exemplary implementation of the disclosure, the analog-to-digital converter 120 may use a transition edge of the sampling clock for sampling the analog sensor signal. Consequently, each digitized sensor signal sample is produced in correspondence with a transition edge of the sampling clock. In accordance with another exemplary implementation of the disclosure, the analog-to-digital converter 120 may use a logic level of the sampling clock for sampling the analog sensor signal. Consequently, each digitized sensor signal sample is produced in correspondence with a high logic level of the sampling clock, for example. The analog-to-digital converter 120 can also include a data pipeline 121 and a trigger signal generator 122. The data pipeline, which can be implemented by using a first-in-first-out memory chip, which, for example, may be used for storing digitized sensor signal samples. The trigger signal generator 122 may be used for generating a trigger signal when the data pipeline 121 is full and the digitized sensor signal samples stored in the data pipeline 121 are ready for use by the controller apparatus 105.

The digitized sensor signal samples may be coupled into a bus 112 in the controller apparatus 105 by using a link 113. The trigger signal may be coupled into the bus 112 in the controller apparatus 105 by using another link 117. A bi-directional communication link 118 may be used for transferring various types of signals such as hand shake signals, between the analog-to-digital converter 120 and the controller apparatus 105. In some implementations, one or both of the link 113 and the link 117 may be configured for carrying bi-directional traffic and used in addition to, or in lieu of, the bi-directional communication link 118.

The controller apparatus 105 can include various components such as a first controller 106, a second controller 107, a supervisor 108, a first peripheral interface 109, a second peripheral interface 111, and an interrupt system 114. It should be understood that the various components of the controller apparatus 105 can be implemented in in hardware, software, firmware, or combinations thereof. The supervisor 108 controls certain operations of the first controller 106 and the second controller 107 such as placing one of the two controllers in an in-service state and the other in a standby state. The supervisor 108 may also control certain operations of the first peripheral interface 109 and the second peripheral interface 111.

In accordance with an exemplary method of operation of the controller apparatus 105, the supervisor 108 may place the first controller 106 in the in-service state and the second controller 107 in the standby state. The supervisor 108 can wait for a trigger signal from the trigger signal generator 122 in the analog-to-digital converter 120. The analog-to-digital converter 120 may generate the trigger signal to indicate to the controller apparatus 105, a change in an operating condition of the power generation unit 110. The trigger signal can be provided in the form of an alert signal with varying levels of priority (low level alert, high level alert, or critical level alert, for example) and the supervisor 108 may determine what action(s) to take based on the trigger signal.

In an exemplary implementation in accordance with the disclosure, the controller apparatus 105 is configured to utilize the trigger signal as an interrupt signal. Accordingly, the interrupt signal may be serviced by utilizing an interrupt system 114 in the controller apparatus 105. Each of the first controller 106 and the second controller 107 can provide information pertaining to an interrupt vector table that may be used by the supervisor 108 to configure the interrupt system 114. The interrupt vector table can include a list of procedure entrance addresses that are utilized for executing routines for various types of interrupts such as for example, a "reset" interrupt, a "timer" interrupt, an "ADC ready" interrupt, a "serial port input ready" interrupt, a "serial port output ready" interrupt, and a "watchdog timer" interrupt. One or more of these types of interrupts may be originated by the analog-to-digital converter 120 and propagated to the controller apparatus 105 via the line 117 and/or the bi-directional communication link 118.

Each of the first controller 106 and the second controller 107 may also provide to the supervisor 108, prioritization level information and interrupt service routines for the various instances associated with the procedure entrance addresses in the interrupt vector table. The various instances can include instantiation of an in-service state for one of the first controller 106 or the second controller 107.

The supervisor 108 can be used to execute various operations such as placing the first controller 106 in the in-service state and allowing the first controller 106 to propagate control signals to the power generation unit 110 through the first peripheral interface 109. The supervisor 108 may perform this operation by providing an enable signal to an output enable terminal of the first peripheral interface 109 and configuring the first controller 106 to use the first peripheral interface 109. The supervisor 108 may concurrently prevent the second controller 107, which is in the standby state, from propagating control signals to the power generation unit 110.

The supervisor 108 can subsequently be used to execute a switch-over operation for placing the first controller 106 in the standby state and the second controller 107 in the in-service state. The supervisor 108 may then allow the second controller 107 to propagate control signals to the power generation unit 110 through the second peripheral interface 111. The supervisor 108 may perform this operation by providing an enable signal to an output enable terminal of the second peripheral interface 111 and configuring the second controller 107 to use the second peripheral interface 111. The supervisor 108 may concurrently prevent the first controller from propagating control signals to the power generation unit 110.

Figure 2:
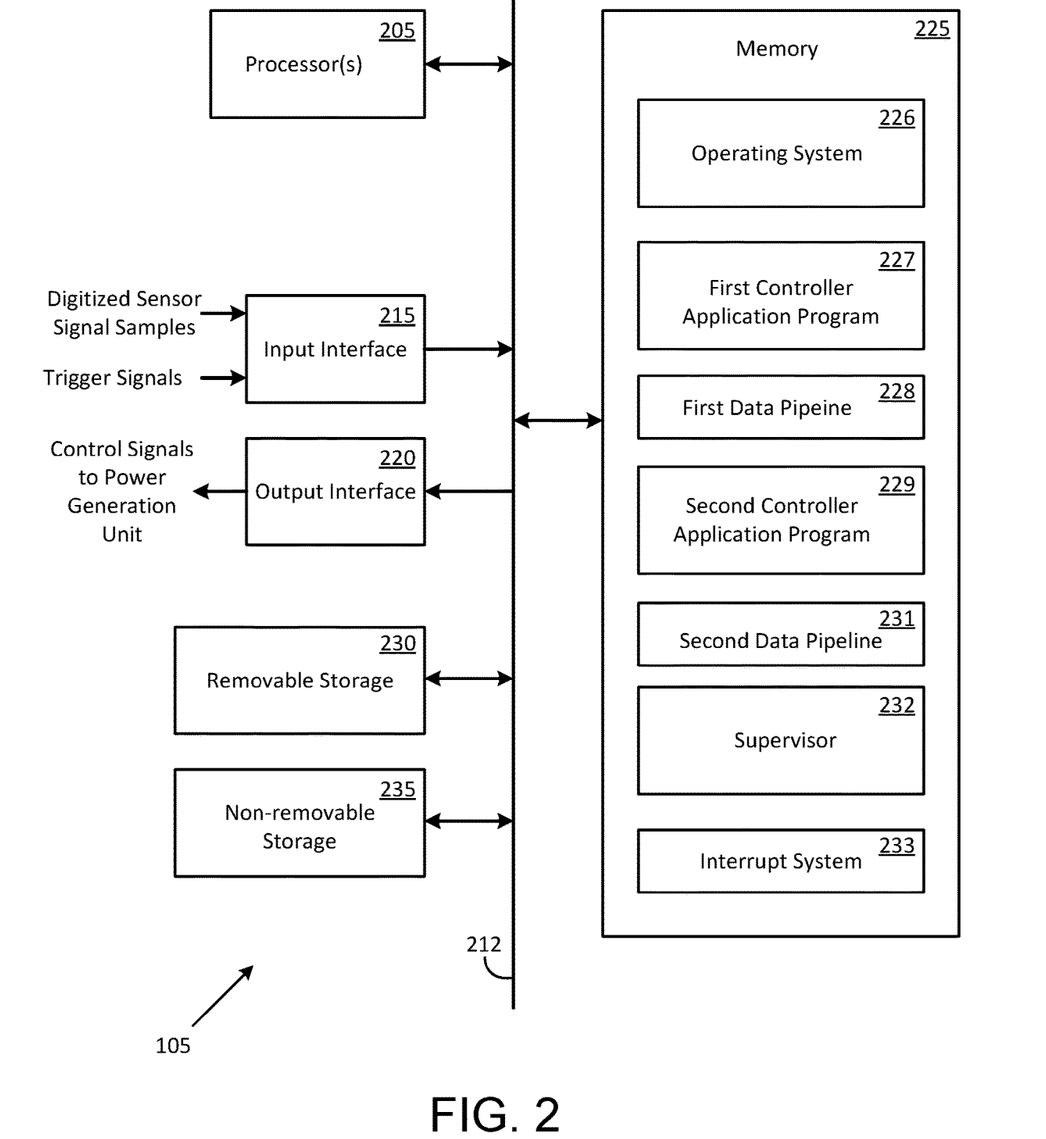
FIG. 2 illustrates some exemplary components that can be included in the controller apparatus shown in FIG. 1.

FIG. 2 illustrates some exemplary components that may be included in the controller apparatus 105 in accordance with certain embodiments of the disclosure. The exemplary components can include a processor 205 capable of communicating with a memory 225. The processor 205 may be implemented as appropriate in hardware, software, firmware, or combinations thereof. Software or firmware implementations of the processor 205 may include computer-executable or machine-executable instructions written in any suitable programming language to perform the various functions described. In one embodiment, instructions associated with a function block language may be stored in the memory 225 and executed by the processor 205.

The memory 225 may store program instructions that are loadable and executable on the processor 205, as well as data generated during the execution of these programs. Depending on the configuration and type of the controller apparatus 105, the memory 225 may be volatile (such as random-access memory (RAM)) and/or non-volatile (such as read-only memory (ROM), flash memory, etc.). In some embodiments, the controller apparatus 105 may also include additional removable storage 230 and/or non-removable storage 235 including, but not limited to, magnetic storage, optical disks, and/or tape storage. The memory 225 and associated computer-readable media may provide non-volatile storage of computer-readable instructions, data structures, program modules, and other data for the devices. In some implementations, the memory 225 may include multiple different types of memory, such as static random-access memory (SRAM), dynamic random-access memory (DRAM), or ROM.

The memory 225, removable storage 230, and non-removable storage 235 are all examples of non-transitory computer-readable storage media. Non-transitory computer-readable storage media may include volatile and non-volatile, removable and non-removable media implemented in any method or technology for storage of information such as computer-readable instructions, data structures, program modules or other data. Additional types of non-transitory computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of non-transitory computer-readable media.

The controller apparatus 105 may also include an input interface 215 that receives input signals such as a trigger signal generated by the trigger signal generator 122 in the analog-to-digital converter 120 and digitized sensor signal samples produced by the analog-to-digital converter 120. The controller apparatus 105 may further include an output interface 220 for providing control signals to the power generation unit 110 via the communication link 116.

Turning to the contents of the memory 225, the memory 225 may include, but is not limited to, an operating system (OS) 226, a first controller application program 227, a first data pipeline 228, a second controller application program 229, a second data pipeline 231, a supervisor 232, and an interrupt system 233. In this exemplary embodiment, the first controller application program 227 is a software program that implements at least some of the functions described above with reference to the first controller 106; the second controller application program 229 is a software program that implements at least some of the functions described above with reference to the second controller 107; and the supervisor 232 is a software program that implements at least some of the functions described above with reference to the supervisor 108.

Some other functions of the first controller 106, the second controller 107, and/or the supervisor 108, may be implemented in hardware that is not shown in FIG. 2. For example, the functionality of the supervisor 108 in terms of enabling the first peripheral interface 109 and/or the second peripheral interface 111 to propagate control signals generated by one of the first controller 106 or the second controller 107 may be implemented using hardware components that are not shown in FIG. 2. Such hardware components may include logic components such as programmable logic devices (PLDs), field-programmable gate arrays (FPGAs), and application specific integrated circuits (ASICs). The use of such logic components may offer faster switching speeds during operations such as when changing the first controller 106 or the second controller 107 from a standby state to an in-service state and vice-versa.

The first data pipeline 228 may be used by the first controller application program 227 to store digitized sensor signal samples when these samples are provided to the controller apparatus 105 by the analog-to-digital converter 120 under control of the supervisor 232. The digitized sensor signal samples can be received in the first data pipeline 228 via the input interface 215 and the bus 212. The bus 212 can be provided in the form of a data bus or in the form of a combined data and communications bus. The digitized sensor signal samples stored in the first data pipeline 228 may also be used by the supervisor 232 to populate the second data pipeline 231 in some implementations. The second data pipeline 231 may be used by the second controller application program 229 in a manner similar to that described above with respect to the first data pipeline 228.

Figure 3:
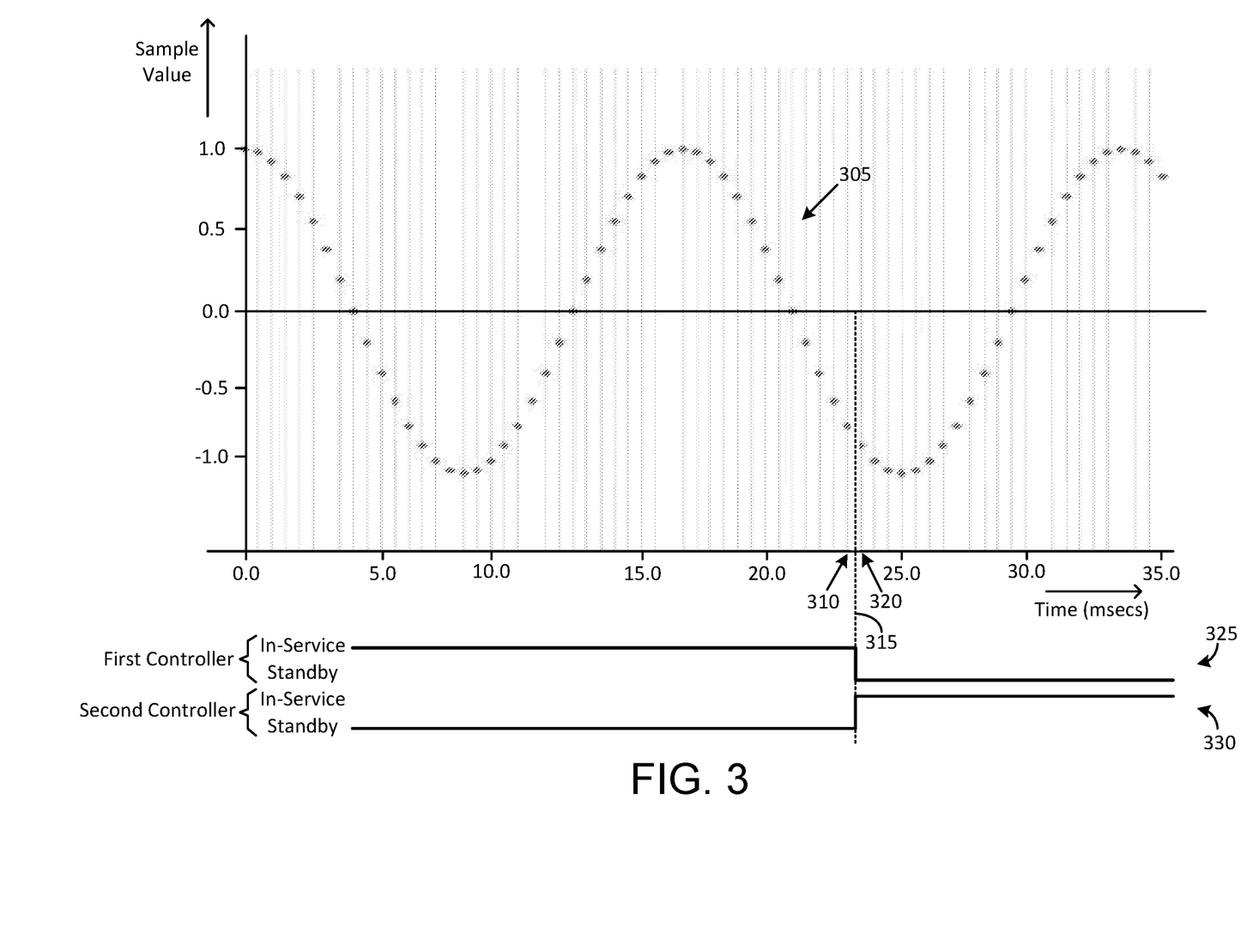
FIG. 3 shows an exemplary waveform indicating sampling instants defined by a sampling clock coupled into an analog-to-digital converter that can be a part of the exemplary system shown in FIG. 1.

FIG. 3 shows an exemplary waveform 305 that indicates sampling instants defined by a sampling clock provided by the sampling clock generator 125 to the analog-to-digital converter 120, according to an embodiment of the disclosure. The exemplary waveform 305, which has a sinusoidal shape, represents an analog sensor signal generated by the sensor system 115 and provided to the analog-to-digital converter 120. In other embodiments, the waveform 305 can have other shapes that are indicative of changes in various types of operating conditions in the power generation unit 110.

The waveform 305 is sampled in the analog-to-digital converter 120 by using the sampling clock provided by the sampling clock generator 125. In one exemplary implementation in accordance with an embodiment of the disclosure, a cycle period of the sampling clock is about 1 msec, which translates to about 1 KHz sampling rate. Attention is drawn to a first sampling instant 310 and a neighboring second sampling instant 320 that correspond to one cycle of the sampling clock. Dashed line 315 is indicative of an interrupt signal that is generated by the analog-to-digital converter 120 during this clock cycle.

Waveform 325 represents an in-service state of the first controller 106 for a first period of time prior to the occurrence of the interrupt signal and a standby state for a second period of time after the occurrence of the interrupt signal. The supervisor 108 responds to receiving the interrupt signal by placing the second controller 107 in the in-service state and the first controller 106 in the standby state. Accordingly, waveform 330 represents a standby state of the second controller 107 for the first period of time prior to the occurrence of the interrupt signal and an in-service state for the second period of time after the occurrence of the interrupt signal.

The switch-over operation takes place in a substantially simultaneous manner and within one clock cycle defined by the neighboring sampling instants 310 and 320. In one exemplary implementation in accordance with an embodiment of the disclosure, the transition time between placing the first controller application program 227 in the standby state and placing the second controller application program 229 in the in-service state is less than about 10 μsecs. Such a fast and near simultaneous switch-over is in contrast to traditional systems where an active controller is taken off line first prior to a standby controller taking over, thereby leaving a power generation unit without controls for a significant period of time.

In contrast to the waveform 325 shown wherein the first controller application program 227 transitions directly from the in-service state to the stand-by state, in some other implementations, the first controller application program 227 may transition from the in-service state to the stand-by state by going through one or more intermediate states. For example, the first controller application program 227 may transition from the in-service state to the standby state after undergoing a sequence of intermediate states such as a standby state, a stopped state, a reprogram state (during which the first controller application program 227 may be revised or replaced), and a warm-up state.

The second controller application program 229 may also transition from the standby state to the in-service state by going through one or more intermediate states. For example, the second controller application program 229 may transition from the standby state to the in-service state after undergoing a sequence of intermediate states such as a stopped state, a reprogram state (during which the second controller application program 229 may be revised or replaced), a warm-up state, and the stand-by state. This sequence of intermediate states may be used to ensure that the second controller application program 229 is up-to-date with the latest revisions and/or updates prior to entering the in-service state.

Figure 4:
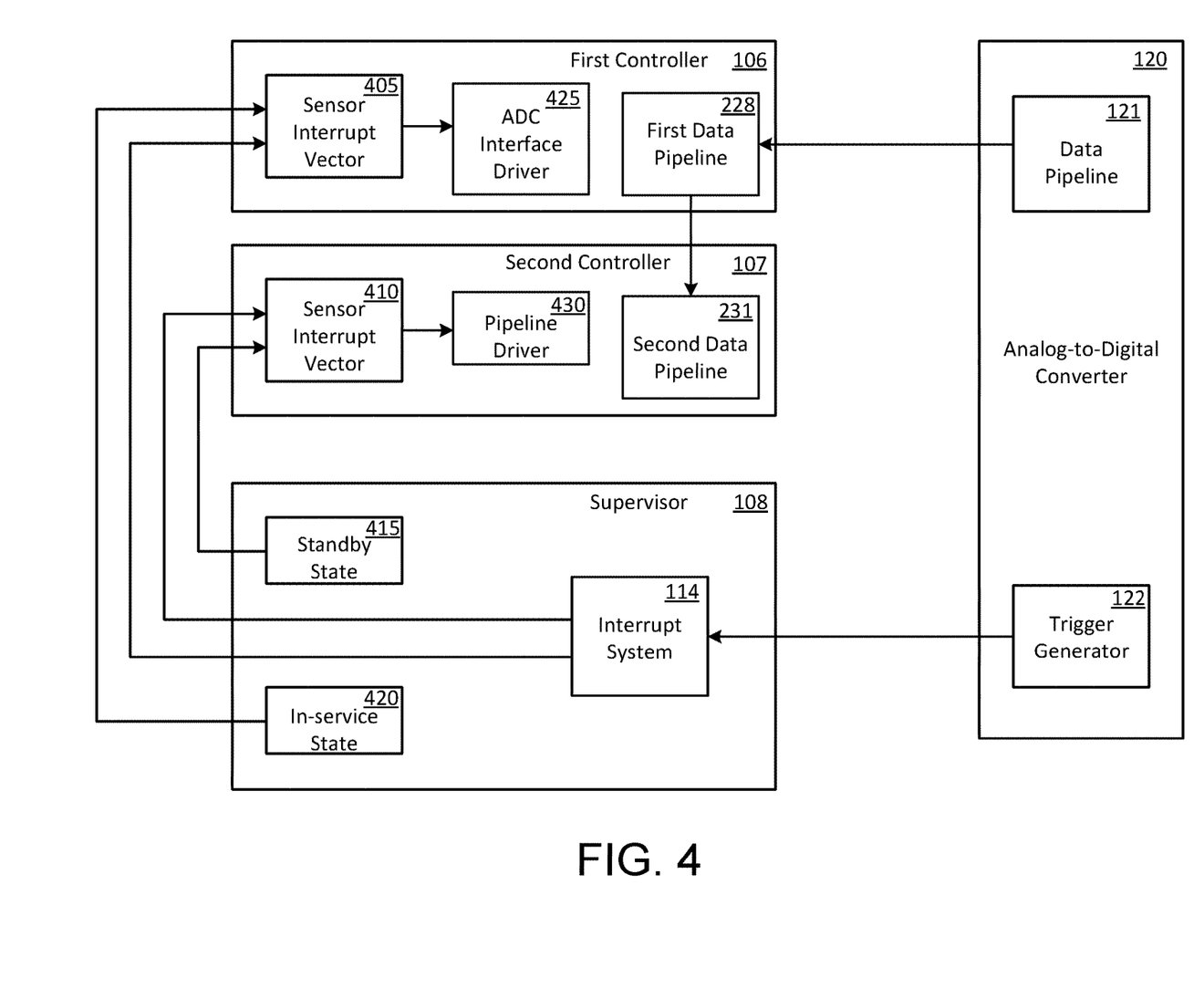
FIG. 4 shows an exemplary configuration for describing a switch-over operation between two controllers in accordance with an exemplary embodiment of the disclosure.

FIG. 4 shows an exemplary configuration for describing a switch-over operation between two controllers in accordance with an exemplary embodiment of the disclosure. The exemplary configuration may include the first controller 106, the second controller 107, the supervisor 108, and the analog-to-digital converter 120 interconnected to each other for executing a switch-over operation in accordance with the disclosure. The following sequence of operations describe a first interrupt service routine that is executed prior to a switch-over event. The switch-over event takes place at the timing instant indicated by the dashed line 315 in FIG. 3.

The first interrupt service routine may include operations such as the analog-to-digital converter 120 filling the first data pipeline 228 in the first controller 106 with digitized sensor signal samples, followed by sending a trigger signal from the trigger signal generator 122 to the supervisor 108. In this example embodiment, the trigger signal is an interrupt signal that is received in the interrupt system 114 (shown in FIG. 2). The interrupt system 114 then initiates a first interrupt handling procedure that calls a sensor interrupt vector 405 in the first controller application program 227 (shown in FIG. 2). The first controller application program 227, which is executed by the first controller 106, communicates with the supervisor 108 and confirms that the first controller 106 is in an in-service state 420. Upon receiving confirmation, the first controller 106 configures the ADC interface driver 425 to interact with the analog-to-digital converter 120, which can include copying the digitized sensor signal samples from the data pipeline 121 into the first data pipeline 228 and schedule the operating system 226 (shown in FIG. 2) to process the digitized sensor signal samples copied into the first data pipeline 228.

The interrupt system 114 then calls a sensor interrupt vector 410 in the second controller application program 229 (shown in FIG. 2). The second controller application program 229, which is executed by the second controller 107, communicates with the supervisor 108 and confirms that the second controller 107 is in the standby state 415. Upon receiving confirmation, the second controller 107 configures the pipeline driver 430 to copy the digitized sensor signal samples stored in the first data pipeline 228 into the second data pipeline 231 and schedule the operating system 226 (shown in FIG. 2) to process the digitized sensor signal samples copied into the second data pipeline 231.

The interrupt system 114 then communicates with the supervisor 108 to determine if a switch-over operation is to be carried out. Upon determining that a switch-over operation is to be carried out, the first controller 106 is placed in a stand-by state and the second controller 107 is placed in an in-service state at the timing instant indicated by the dashed line 315 in FIG. 3.

Figure 5:
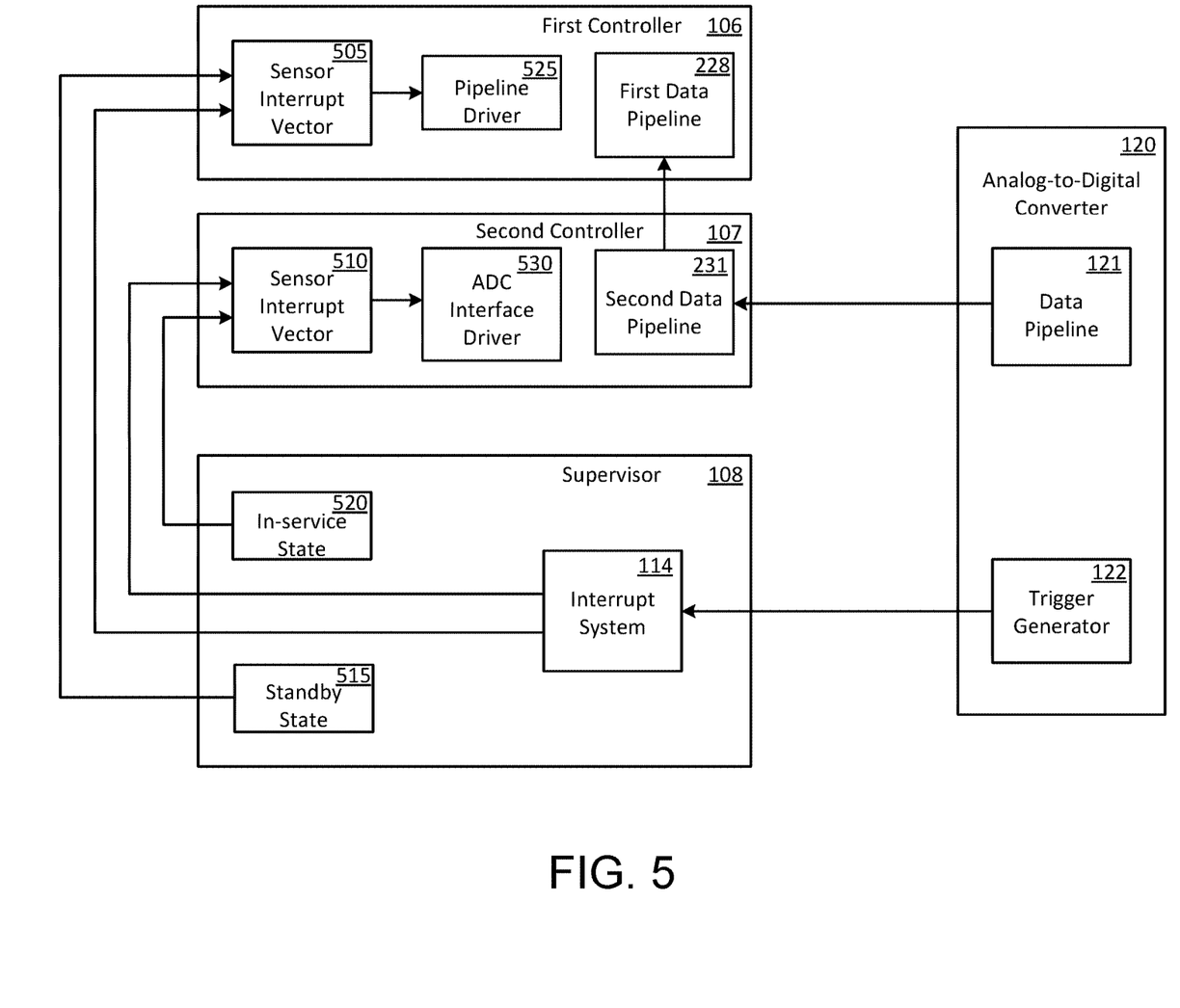
FIG. 5 shows an exemplary configuration for executing an interrupt service routine after the switch-over operations described above with reference to FIG. 4.

FIG. 5 shows an exemplary configuration, in accordance with an exemplary embodiment of the disclosure, for executing a second interrupt service routine after the switch-over operations described above with reference to FIG. 4. The operations described above can be substantially replicated with the second controller 107 now in the in-service state and the first controller 106 in the stand-by state. The second controller application program 229 in the second controller 107 may now be a revised version of the second controller application program 229.

The second interrupt service routine may include operations such as the analog-to-digital converter 120 filling the second data pipeline 231 in the second controller 107 with digitized sensor signal samples and sending a trigger signal from the trigger signal generator 122 to the supervisor 108. The trigger signal can be another interrupt signal that is received in the interrupt system 114. The interrupt system 114 initiates a second interrupt handling procedure that calls a sensor interrupt vector 510 in the revised version of the second controller application program 229 in the second controller 107. The revised version of the second controller application program 229 communicates with the supervisor 108 and confirms that the second controller 107 is in an in-service state 520. Upon receiving confirmation, the second controller 107 configures the ADC interface driver 530 to interact with the analog-to-digital converter 120, which can include copying the digitized sensor signal samples from the data pipeline 121 into the second data pipeline 231 and utilizing the operating system 226 (shown in FIG. 2) to schedule processing of the digitized sensor signal samples copied into the second data pipeline 231.

The interrupt system 114 then calls a sensor interrupt vector 505 in the first controller application program 227 (shown in FIG. 2). The first controller application program 227 communicates with the supervisor 108 and confirms that the first controller 106 is in the standby state 415. Upon receiving confirmation, the first controller 106 configures the pipeline driver 525 to copy the digitized sensor signal samples stored in the second data pipeline 231 into the first data pipeline 228, and utilize the operating system 226 (shown in FIG. 2) to schedule processing of the digitized sensor signal samples copied into the first data pipeline 228.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims. Although That which is claimed is:

1. A method comprising:
generating a sensor signal based on sensing at least one operating condition of a physical asset;
utilizing an analog-to-digital converter to generate a first digitized sensor signal sample of the sensor signal;
receiving the first digitized sensor signal sample in a first controller apparatus;
executing a first application program in the first controller apparatus to generate a first control signal based at least in part on processing the first digitized sensor signal sample;
placing the first application program in an in-service state to allow transmission of the first control signal by the first application program to the physical asset;
utilizing the first application program to transmit the first control signal to the physical asset;
executing a second application program in a second controller apparatus to generate the first control signal based at least in part on processing the first digitized sensor signal sample;
placing the second application program in a standby state to prevent transmission of the first control signal by the second application program to the physical asset;
receiving a first interrupt signal from the analog-to-digital converter;
executing, based on the first interrupt signal, the first application program to copy a second digitized sensor signal sample from the analog-to-digital converter into the first controller apparatus;
executing, based on the first interrupt signal, the second application program to copy the second digitized sensor signal sample from the first controller apparatus to the second controller apparatus;
responding to the first interrupt signal, at least in part, by placing the first application program in the standby state and placing the second application program in the in-service state, wherein transition time from the in-service state of the first application program to the in-service state of the second application program is substantially instantaneous with respect to continuous control over the physical asset;
receiving a second interrupt signal from the analog-to-digital converter;
executing, based on the second interrupt signal, the second application program to copy a third digitized sensor signal sample from the analog-to-digital converter into the second controller apparatus; and
executing, based on the second interrupt signal, the first application program to copy the third digitized sensor signal sample from the second controller apparatus to the first controller apparatus.

2. The method of claim 1, wherein the physical asset is a power generation unit.

3. The method of claim 1, wherein placing the first application program in the standby state and placing the second application program in the in-service state is executed within one clock cycle of a sampling clock applied to the analog-to-digital converter.

4. The method of claim 3, wherein the transition time between placing the first application program in the standby state and placing the second application program in the in-service state is less than 10 μsecs.

5. The method of claim 4, wherein a cycle period of the sampling clock is 1 msec.

6. The method of claim 1, further comprising:
replacing the first application program with a revised application program when the first application program is in the standby state;
executing the revised application program in the first controller apparatus to process the third digitized sensor signal sample and generate therefrom, a second control signal;
responding to the second interrupt signal, at least in part, by placing the second application program in the standby state and placing the first application program in the in-service state; and
utilizing the first application program to transmit the second control signal to the physical asset.

7. The method of claim 6, wherein the first interrupt signal and the second interrupt signal are propagated by the analog-to-digital converter to the first controller apparatus and the second controller apparatus, respectively, during a time period between two sampling instants defined by a sampling clock applied to the analog-to-digital converter.

8. A method comprising:
generating a sensor signal based on sensing at least one operating condition of a physical asset associated with a power generation unit;
utilizing an analog-to-digital converter to generate first digitized sensor signal samples of the sensor signal;
receiving the first digitized sensor signal samples in a first controller apparatus;
executing a first application program in the first controller apparatus to generate one or more control signals based at least in part on processing the first digitized sensor signal samples;
placing the first application program in an in-service state to allow transmission of the one or more control signals by the first application program to the physical asset;
executing a second application program in a second controller apparatus to generate the one or more control signals based at least in part on processing the first digitized sensor signal samples;
placing the second application program in a standby state to prevent transmission of the one or more control signals by the second application program to the physical asset;
receiving a first interrupt signal from the analog-to-digital converter;
executing, based on the first interrupt signal, the first application program to copy a second digitized sensor signal sample from the analog-to-digital converter into the first controller apparatus;
executing, based on the first interrupt signal, the second application program to copy the second digitized sensor signal sample from the first controller apparatus to the second controller apparatus;
placing the first application program in the standby state and placing the second application program in the in-service state in a first time period that is less than one clock cycle of a sampling clock utilized by the analog-to-digital converter, wherein transition time from the in-service state of the first application program to the in-service state of the second application program is substantially instantaneous with respect to continuous control over the physical asset;
receiving a second interrupt signal from the analog-to-digital converter;

executing, based on the second interrupt signal, the second application program to copy a third digitized sensor signal sample from the analog-to-digital converter into the second controller apparatus; and executing, based on the second interrupt signal, the first application program to copy the third digitized sensor signal sample from the second controller apparatus to the first controller apparatus.

9. The method of claim 8, wherein placing the first application program in the standby state and placing the second application program in the in-service state is executed in response to receiving in the first controller apparatus, the first interrupt signal from the analog-to-digital converter.

10. The method of claim 9, wherein the first interrupt signal is provided by the analog-to-digital converter to the first controller apparatus in-between two sampling instants defined by the sampling clock.

11. The method of claim 8, further comprising:
replacing the first application program with a revised application program when the first application program is in the standby state; and
placing the revised application program in the in-service state and placing the second application program in the standby state in a second time period that is less than the one clock cycle of the sampling clock utilized by the analog-to-digital converter.

12. The method of claim 11, wherein placing the revised application program in the in-service state and placing the second application program in the standby state is executed in response to receiving in the second controller apparatus, the second interrupt signal from the analog-to-digital converter.

13. The method of claim 12, wherein the second interrupt signal is provided by the analog-to-digital converter to the second controller apparatus in-between two sampling instants defined by the sampling clock.

14. A system comprising:
a power generation unit;
at least one sensor coupled to the power generation unit, the at least one sensor configured to sense at least one operating condition of the power generation unit and generate a first sensor signal indicative of the at least one operating condition of the power generation unit;
an analog-to-digital converter configured to receive the first sensor signal from the at least one sensor and generate first digitized sensor signal samples by using a sampling clock; and
a first controller apparatus comprising:
a first input interface configured to receive the first digitized sensor signal samples;
a first output interface configured to propagate one or more first control signals to the power generation unit;
a first memory configured to store a first application program; and
a first processor operable to access the first memory and execute operations comprising:
placing the first application program in an in-service state;
executing the first application program to generate the one or more first control signals by processing the first digitized sensor signal samples;
receiving a first interrupt signal from the analog-to-digital converter;
executing, based on the first interrupt signal, the first application program to copy a second digitized sensor signal sample from the analog-to-digital converter into the first controller apparatus; and
executing, based on a second interrupt signal, the first application program to copy a third digitized sensor signal sample from a second controller apparatus to the first controller apparatus;
the second controller apparatus comprising:
a second input interface configured to receive second digitized sensor signal samples;
a second output interface configured to propagate one or more second control signals to the power generation unit;
a second memory configured to store a second application program; and
a second processor operable to access the second memory and execute operations comprising:
placing the second application program in a standby state;
executing the second application program to generate the one or more second control signals by processing the second digitized sensor signal samples;
receiving the second interrupt signal from the analog-to-digital converter; and
executing, based on the second interrupt signal, the second application program to copy the third digitized sensor signal sample from the analog-to-digital converter into the second controller apparatus;
responding to the first interrupt signal, at least in part, by placing the first application program in the standby state and placing the second application program in the in-service state, wherein transition time from the in-service state of the first application program to the in-service state of the second application program is substantially instantaneous with respect to continuous control over the physical asset.

15. The system of claim 14, wherein placing the first application program in the standby state and placing the second application program in the in-service state is carried out in a first time period that is less than one clock cycle of the sampling clock utilized by the analog-to-digital converter.

16. The system of claim 15, wherein the analog-to-digital converter is configured to transmit the first interrupt signal to the first controller apparatus during a time period between two sampling instants defined by the sampling clock utilized by the analog-to-digital converter.

17. The system of claim 14, wherein the transition time between placing the first application program in the standby state and placing the second application program in the in-service state is less than 10 μsecs.

18. The system of claim 17, wherein a cycle period of the sampling clock is 1 msec.

19. The system of claim 14, wherein the first controller apparatus further comprises:
a first peripheral interface configured to propagate the one or more first control signals from the first controller apparatus to the power generation unit under control of the first processor when the first application program in the in-service state; and
wherein the second controller apparatus further comprises:
a second peripheral interface configured to propagate the one or more second control signals from the second controller apparatus to the power generation unit under control of the second processor when the second application program in the in-service state.

20. The system of claim 19, wherein the first processor is operable to place the first peripheral interface in an output disabled condition when the first application program in the standby state and wherein the second processor is operable to place the second peripheral interface in the output disabled condition when the second application program in the standby state.

\* \* \* \* \*